Sept. 25, 1945. E. P. BULLARD, 3D., ET AL 2,385,605
MACHINE TOOL
Filed Nov. 4, 1939 3 Sheets-Sheet 2
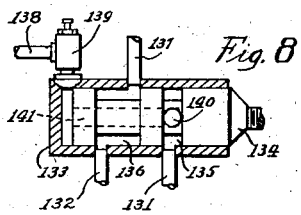
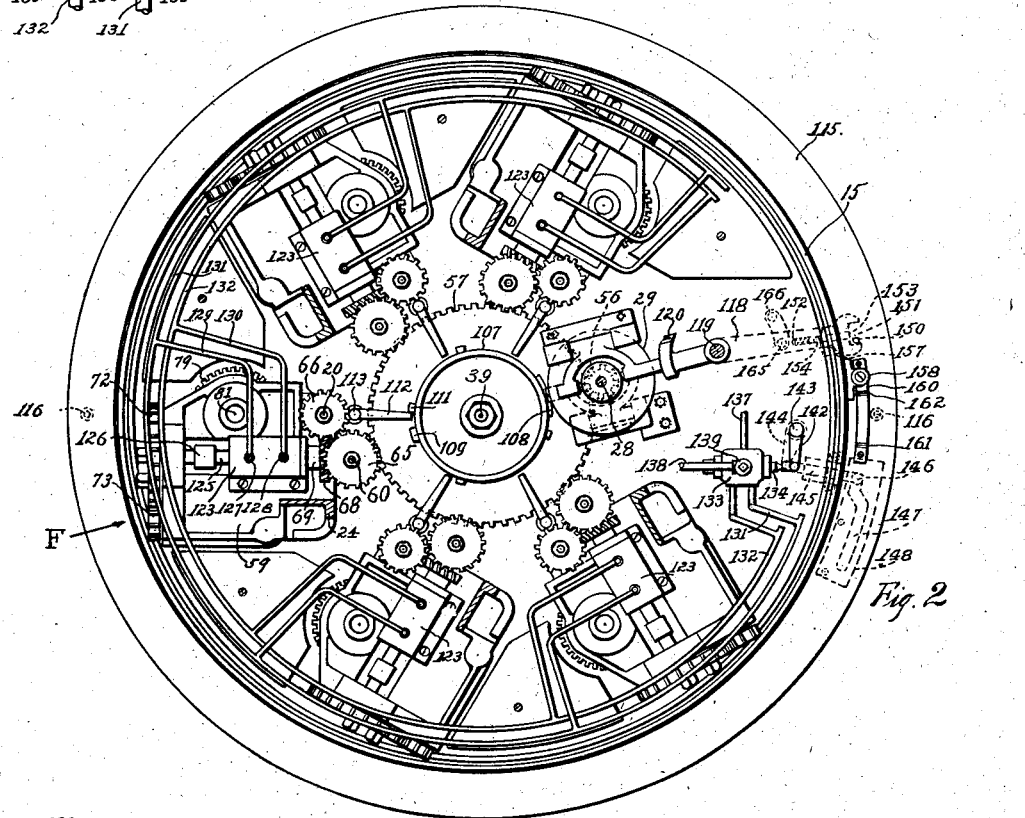
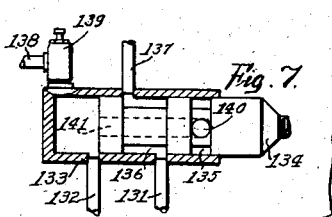
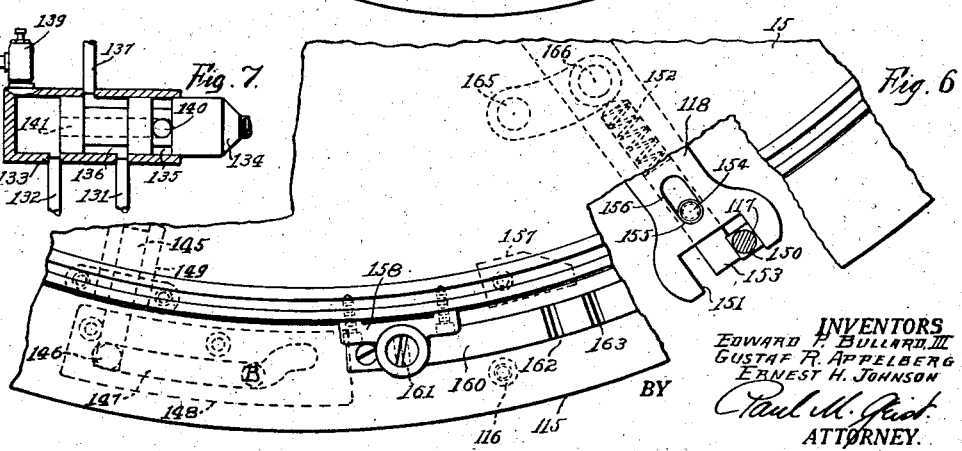
INVENTORS
EDWARD P. BULLARD, III
GUSTAF R. APPELBERG
ERNEST H. JOHNSON
BY
ATTORNEY.

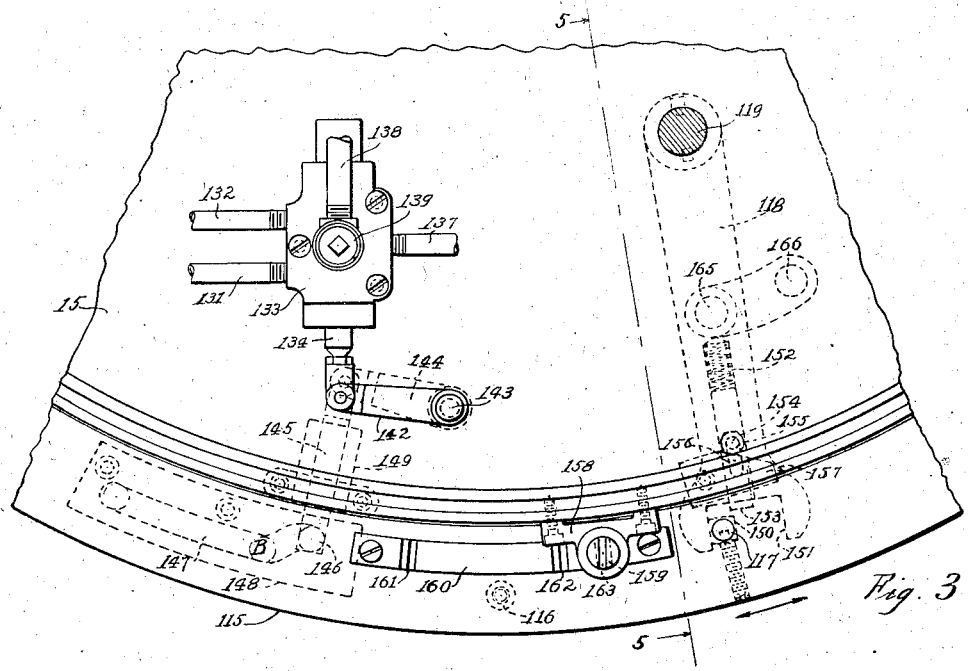

Patented Sept. 25, 1945

2,385,605

UNITED STATES PATENT OFFICE 2,385,605

MACHINE TOOL

Edward P. Bullard, III, Fairfield, and Gustaf R. Appelberg and Ernest H. Johnson, Bridgeport, Conn., assignors to The Bullard Company, a corporation of Connecticut Application November 4, 1939, Serial No. 302,834

18 Claims. (Cl. 29—38)

This invention relates to machine tools of the type that employ separate motions between the tool and work during metal working operations, and particularly to apparatus for starting and stopping the movements of the tool and work in accordance with a predetermined sequential order.

Although the principles of the invention are applicable to any machine tool in which the starting and stopping of the tool and work movements are desired to be controlled, they will be described in connection with a multiple spindle lathe of the type disclosed in Patents 1,360,175; 1,382,340; 1,455,282; and 1,845,478 granted to E. P. Bullard.

Metal working operations, especially those performed on lathes, remove metal spirally from the work. Simultaneous stopping of the rotating work and the rectilinearly moving tool leaves the tool point buried in the work to a depth depending upon the feed of the cutting tool. Subsequent starting of the lathe causes excessive forces for the transmission of the lathe to overcome; breaking of tool points; chattering of the tool with attendant marking of the work; as well as other harmful results incident to cutting work that is rotating at speeds lower than proper cutting speed.

An object of this invention is to provide apparatus adapted to be incorporated within a machine tool for sequentially controlling the starting and stopping of the respective drives for the work and the tool.

Other objects include, the provision of a lathe comprising apparatus for stopping the tool feeding drive prior to stopping the work rotating drive; the provision of a lathe comprising apparatus for starting the work-rotating drive prior to starting the tool feeding drive; the provision of a lathe comprising unitary apparatus for stopping the work-rotating drive prior to stopping the tool feeding drive and for starting the former prior to starting the latter; and the provision of a lathe comprising fluid-operated means for controlling the starting and stopping of the tool feeding drive in predetermined order relative to, as well as in response to the manual starting and stopping of the work-rotating drive.

The above, other objects and novel features of the invention will become apparent from the following specification and the accompanying drawings, in which:

Fig. 2 is a plan view of the upper portion of the machine taken substantially along the line 2—2 of Fig. 1;

Fig. 3 is an enlarged plan view of a fragmentary portion of the apparatus disclosed in Fig. 2;

Fig. 4 is an elevational view of the apparatus shown in Fig. 3;

Fig. 5 is a section taken substantially along the line 5—5 of Fig. 3;

Fig. 6 is a view similar to that shown in Fig. 3, with the control elements in different positions;

Fig. 7 is a diagrammatic section of a feature of the invention; and

Fig. 8 is a view similar to that of Fig. 7 with the parts in a different position.

Figure 1:
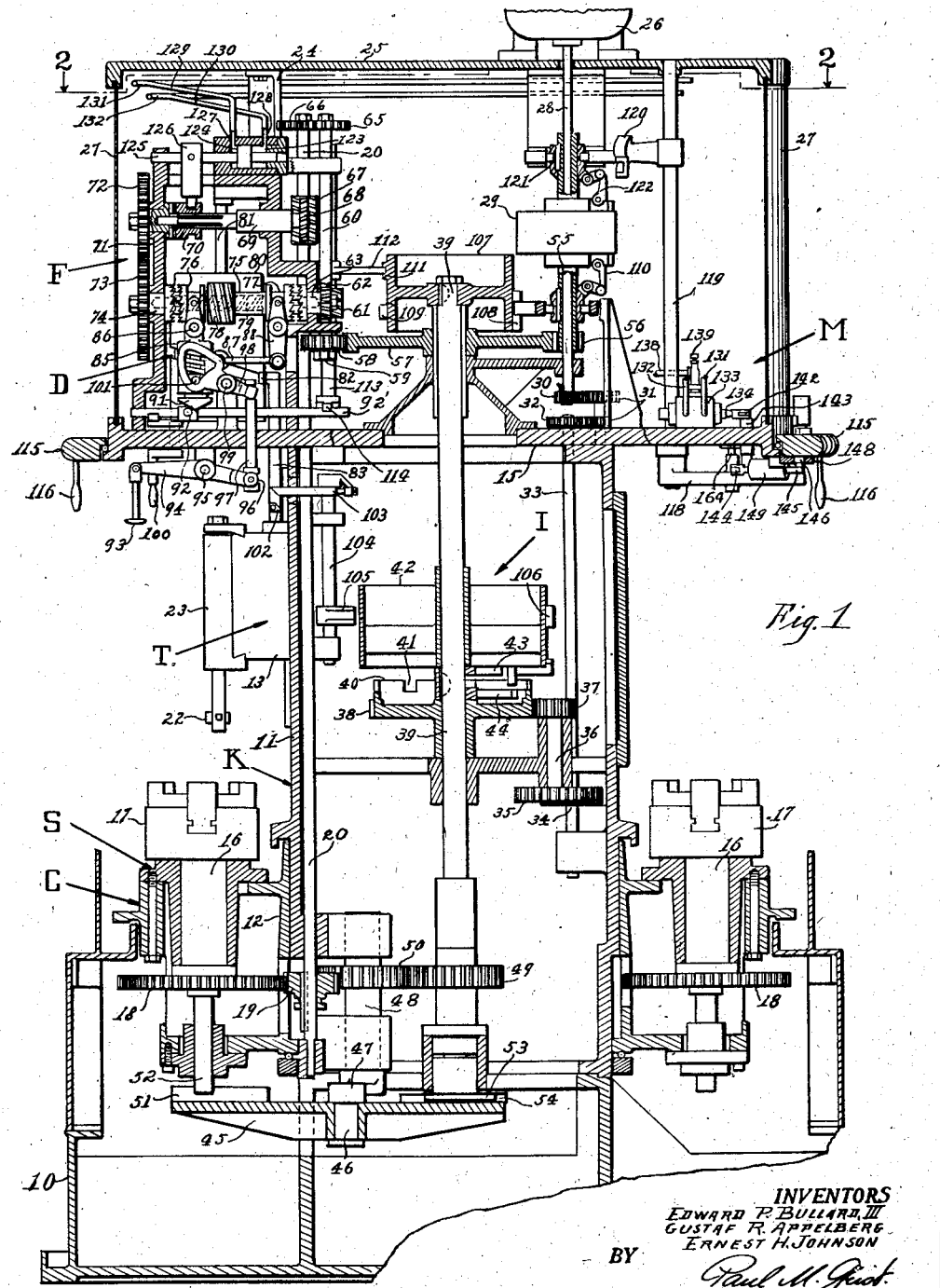
Figure 1 is a sectional elevational view of a multiple spindle lathe embodying the principles of the invention.

Referring to Fig. 1, the principles of the invention are shown as applied to a multiple-spindle vertical type lathe having six spindles S, each supplied with a work-supporting table. The spindles are journaled in an annular-shaped carrier C surrounding a central column K. The carrier C is adapted to be indexed in a step by step motion about the column K by an indexing mechanism I, thereby successively to bring the work pieces on the tables into operating positions beneath a plurality of tool slides T driven by cam drums D located about the central column K. Each cam drum D is operated from a feed works F located in the upper part of the machine. There are five working stations, and one loading and unloading station. The five feed-works F are mounted within a housing supported on the upper portion of the column K. This housing additionally supports manually controlled, fluid-operated mechanism M adapted to start the rotation of the spindles S prior to starting the drive for the cam drums D, and for stopping the drive for the drums D prior to stopping the rotation of the spindles S.

Referring to Fig. 1, the lathe comprises a base 10, a central portion of which provides a support for the column K. The column K is characterized by a substantially hollow member 11 having a lower portion providing a bearing for the rotatable carrier C; an elongated hexagonal central portion provided with guide ways on its outside for tool slides 13 (only one being shown); a housing for the indexing mechanism I; and a top on which a base plate 15 is mounted for supporting the feed works F.

The carrier C comprises a substantially annular-shaped frame 12 in which a number of spindles 16 are journaled. In the machine illustrated, there are six spindles 16 each provided with a work table or chuck 17 on its upper end and a gear 18 on its lower portion by means of which the tables are driven when the carrier is stationed beneath the tool slide 13. The spindles 16 are operated by sliding gears 19 mounted on vertically disposed shafts 20 connected with, and driven by separate feed-works units F for each of said spindles. The five feed-works units F are also employed to impart movement to the tool slides 13 to feed tools 22, carried in tool holders 23, in a manner to operate upon work carried by the tables 17.

A standard 24 mounted on plate 15 is adapted to support a top plate 25 upon which may be secured power means, in the form of a motor 26, for driving the lathe. The under edge portion of the top plate 25 and the top edge portion of the feed-works base plate 15 are provided with annular grooves which align with each other for receiving the guiding plates 27 that serve to enclose the feed-works and other mechanism contained within the upper part of the machine.

The carrier C is adapted to be indexed about the column K by the indexing mechanism I driven by the motor 26. A shaft 28 extends downwardly from the motor 26 through the top plate 25 and through a main driving clutch 29 that is adapted to be manually and automatically operated to connect and disconnect the shaft 28 to the drive for the feed-works F. The lower end of the drive shaft 28 is provided with a pinion 30 which drives, through idler gears 31, a pinion 32 secured to a shaft 33. A pinion 34, secured to the lower end of the shaft 33, drives a gear 35 upon a stub shaft 36 which is journaled in a bearing inside the column K. Upon the upper end of the shaft 36 is mounted a pinion 37 that meshes with a gear 38 loosely journaled upon a central indexing shaft 39. The upper portion of gear 38 includes a clutch face 40 including slots 41. A controller 42 is likewise journaled on the shaft 39 and is resiliently connected to an arm 43 keyed to shaft 39. The arm 43 supports a pin 44 that is adapted selectively to connect the gear 38 to shaft 39 upon cooperative action between the controller 42 and the tool slides 13, all as more fully described in Patents 1,360,175 and 2,259,948.

Upon connecting shaft 39 to gear 38, the indexing mechanism I is adapted to be actuated. This indexing mechanism comprises an oscillatable index arm 45 journaled on a pin 46 at the outer end of a crank arm 47. The inner end of crank arm 47 is keyed to a shaft 48 that is driven by shaft 39 through gears 49 and 50. The one end of arm 45 is provided with a groove 51 adapted to engage the lower reduced portion 52 of the spindles 16. The opposite end of arm 45 is provided with a cross-head connection with a pivotal slide 53 coaxial with shaft 39 and which is adapted to cooperate with slide bearings 54 in the arm 45. The specific construction of the indexing mechanism I is substantially the same as that disclosed in Patent 1,360,175.

The spindles 16 as well as the tool slides 13 are adapted to be driven by the motor 26 through the feed-works F and the vertically-disposed shafts 20. Furthermore, the feed-works units F are adapted to operate the slides 13 at feeding speeds directly related to the speeds at which spindles 16 are rotated as well as to operate said slides 13 at relatively rapid traverse speeds.

The shaft 28, extending through the clutch 29, supports a sleeve 55 that is adapted to be connected to and disconnected from the shaft 28 by operating clutch 29. A spur gear 56 is keyed to sleeve 55 and meshes with a gear 57 freely journaled on the indexing drive shaft 39 at the center of column K. The gear 57 meshes with a gear 58 for each of the feed-works units F. Since all of the units F are identical, only one has been shown.

As previously stated the five units F are arranged in a circle about the gear 57 and each includes a gear 58 in meshing engagement therewith. The gear 58 is fixed to the lower end of a vertically-disposed shaft 60 by a nut 59. The vertical shaft 60 is provided with a spiral gear 61 that meshes with a similar spiral gear 62, secured to a sleeve of a clutch member 63. Upon the upper end of the vertical shaft 60 is mounted a change gear 65 adapted to drive a second change gear 66 mounted upon the upper end of vertical shaft 20. Near the upper end of the shaft 20 is also mounted a worm 67 that meshes with and drives a worm gear 68 mounted upon a horizontal shaft 69 and having splined thereon a sliding clutch member 70 for a purpose to be described later. A clutch member 71, adapted to cooperate with clutch 70, is provided with an extension adapted to receive various change gears 72 positioned to mesh with corresponding change gears 73 on an extension of a clutch member 74. A shaft 75, journaled in the clutch member 63 at one end and journaled in the clutch member 74 at the other end, is provided with sliding clutch sleeves 76 and 77 positioned to engage the clutch members 74 and 63 respectively. The shaft 75 is splined to slidably receive the sleeves 76 and 77 and carries a worm 78 engaging a worm gear 79 secured to the cam drum D. The cam drum D comprises a substantially cylindrical member 80 secured to a vertical shaft 81. The drum 80 is provided with a groove that engages a roll 82 secured to a vertical shaft 83 that passes through the feed works base 15 and is attached to the tool slide 13 on the outside of column K.

The clutch sleeve 76 is provided with a groove to receive the forked end of a plunger lever 85 pivoted at 86. The plunger lever 85 is joined by a rod 87 to a forked lever 88 pivoted in like manner and engaging a groove in the sleeve 77. The arrangement is such that when the lever 85 is moved the lever 88 will be moved likewise. The plunger lever 85 is provided with a spring urged plunger terminating in an arrow-head 91, which tends, by engagement with a pin 92 on a rod 92', to rock the plunger lever 85 to the extreme position in one direction or the other.

To provide for manually neutralizing the clutch sleeves 76 and 77, a handle 93 is suspended from the outer end of a lever 94 hinged on a stud 95 which is attached to the feed-works base 15. The inner end of the lever 94, being forked, engages an annular groove 96 in the lower end of a shaft 97 extending vertically through a clearance hole in the feed works base 15. The upper end of the shaft 97 engages one end of a neutralizing yoke 98 fulcrumed at 99. The yoke is provided with an irregular opening to receive a pin 101 secured to the plunger lever 85. The arrangements being such, that when the pin 101 is in the lower and narrower part of the opening, the clutch sleeves 76 and 77 are disengaged from the clutch members 74 and 63. When the yoke 98 is rocked to bring the pin 101 to the upper and larger part of the opening, the plunger 85 is free to move and allow the engagement of the clutch sleeves 76 and 77 with their respective clutch members 74 and 63. From the foregoing it will be noted that the clutch member 63 is driven at a constant speed through the spiral gears 61 and 62, while the clutch 74 is driven at a changeable speed through the change gears 65, 66, 72 and 73. Therefore, by the engagement of the clutch sleeve 76 with the clutch member 74 or the clutch sleeve 77 with the clutch member 63 the shaft 75, worm 78, worm gear 79 and drum D may be driven at different speeds. Manual shifting of the shaft 92' may be effected by turning a handle 100 that is connected to the shaft 92' by a crank arm.

Automatic shifting of the clutches 76 and 77 to effect movement of the slide 13 during a working operation and to neutralize said clutches at the top of the stroke of slide 13 is controlled by a disc (not shown) having adjustable dogs that are adapted to shift the rod 92' in a manner substantially the same as the disc 193 shifts the rod 187 in Patent 1,360,175.

An additional automatic control is provided for the clutches 76, 77 and the main clutch 29 during indexing of the carrier C. As the tool slide 13 ascends to its upper position after performing a working operation, a cam element 102 on the link 83 is adapted to engage a rod 103 that is connected to one end of a crank, the opposite end of which is fixed to an oscillatable shaft 104. A lug 105 is fixed to shaft 104 and is adapted to cooperate with one of a plurality of similar lugs 106 on the controller 42 to releasably hold said controller against rotation. Each slide T is provided with a separate such means and the respective lugs 105 are adapted to be moved to a position releasing controller 42 as the respective heads reach their upper limiting positions. Release of the controller 42 causes the plunger 44 to effect a connection between shaft 39 and gear 38 whereupon the index shaft 39 is rotated through a single revolution. During the single revolution of the shaft 39, the clutch 29 is adapted to be disconnected from the sleeve 55 to effect stopping of the spindles 16; the gear 19 is lifted out of mesh with the gear 18 by a cam (not shown); the crank 45 indexes carrier C to the next succeeding station; the gear 19 is dropped into mesh with gear 18; the clutch 29 is engaged to sleeve 55 to re-start the drive for the spindles 16; and finally, the clutch 77 is engaged to re-start the downward movement of the slide 13. All of the above listed functions are adapted to be effected sequentially in the order named during the single revolution of shaft 39. Accordingly, an additional controller 107 is keyed to the top of shaft 39. This controller is provided with cams 108, 109 adapted to disengage and engage clutch 29 with the sleeve 55 through the toggle joint 110. The controller 107 also includes a cam 111 adapted to cooperate with a link 112. The link 112 is fixed to a vertically-disposed shaft 113 that is connected to the rod 92' by a crank 114.

Referring to Fig. 1, the controller 107 moves in a clockwise direction so that cam 108 initially disengages clutch 29 from sleeve 55. During substantially the first half of the revolution of controller 107 the indexing mechanism I lifts the gear 19 out of mesh with gear 18, indexes the carrier C, and drops gear 19 into mesh with gear 18. At this point in the revolution of controller 107, cam 109 effects engagement of clutch 29 with sleeve 55 to re-start the drive for spindles 16. Subsequently, cam 111 engages link 112 to engage clutch 77 with clutch 63 to begin a new working cycle.

The clutch 29 is adapted to be manually connected to, and disconnected from the sleeve 55 by oscillating a ring 115 that surrounds, and is journaled on the base-plate 15. The ring 115 is provided with depending handles 116 spaced at convenient points about the ring so that the machine may be started and stopped conveniently. Referring to Figs. 1 and 5, the ring 115 is provided with a depending rod 117 that is connected to one end of an arm 118, the opposite end of which is fixed to a vertically-disposed shaft 119. The shaft 119 is provided with a cam member 120 adapted to shift a spool 121 splined to the sleeve 55. The spool 121 is also connected to the clutch 29 through a toggle joint 122. Slight oscillatable movement of ring 115 will engage and disengage shaft 28 from sleeve 55 through clutch 29.

During the setting up of a job on the lathe, frequent manual stopping and starting of the drives for rotating the spindles 16 and for operating the slides 13 is necessary so that the operator may inspect the manner in which the cutting is proceeding. Additionally, should the lathe inadvertently stop, due to power failure, while a cutting operation is proceeding, manual re-starting is required. Under these circumstances, the tool is buried in the work due to the fact that metal is spirally removed, and upon re-starting, the previously described difficulties such as tool chatter, tool breakage, work marking and undue straining of the lathe transmission are encountered. This invention provides means M between the manually-operable ring 115 and the the feed-works F to insure stopping the drive for the slides 13 prior to stopping the drive for the spindles 16, and for manually starting the latter prior to starting the former.

Referring to Figs. 1 and 2, each of the feed-works F is provided with a cylinder 123 in which a fluid-operated piston 124 is adapted to reciprocate. The piston 124 is provided with a piston rod 125 that is connected to an arm 126 which in turn engages clutch element 70. Fluid under pressure is alternately applied to opposite sides of the piston 124 through inlets 127, 128 that are connected to branch conduits 129, 130 leading from main conduits 131, 132 common to all the feed-works F. The main conduits 131, 132 are alternately supplied with fluid under pressure through a valve 133.

Referring to Figs. 3, 7 and 8, the valve 133 is mounted on the top of the base-plate 15 and includes a piston 134 having two spaced annular grooves 135 and 136. The valve 133 is likewise provided with a fluid inlet 137 and an exhaust 138 in which a relief valve 139 is provided for maintaining a predetermined pressure within the valve 133 and for insuring that the system is completely filled with fluid. In the position of piston 134 as shown in Fig. 7, the conduit 131 is supplied with fluid under pressure from the inlet 137 and the fluid in conduit 132 is exhausted through the line 138. In Fig. 8, the piston 134 is in position to admit fluid under pressure to the conduit 132 from the inlet 137, and to exhaust the fluid in conduit 131 to line 138 through radially and axially disposed passages 140, 141 in the piston 134. The piston 134 is adapted to be axially moved by the oscillation of ring 115 to selectively admit fluid to opposite sides of piston 124 (Fig. 1). Accordingly, the plunger 134 is conected to a lever 142 attached to the upper end of a shaft 143 extending vertically through the feed-works base 15. The lower end of shaft 143, beneath the base 15, has attached thereto a lever 144 (Figs. 3 and 4) connected to an operating rod 145. A cam follower 146 is mounted on one end of rod 145 and is positioned to traverse a cam groove 147 in a cam 148 secured to the under side of the control ring 115. The rod 145 is guided for axial movement in a suitable bracket 149 secured to the feed-works base 15. The cam groove 147 is provided with an offset portion to provide the necessary radial movement of rod 145 to actuate valve 133, and an arcuate portion for a purpose to be described later.

The connection between the arm 118 and the ring 115 cooperates with the arcuate and offset portions of cam groove 147 to effect the sequential operation of the clutch 29 and the valve 133 to start the spindles 16 rotating before starting the feeding of the slide 13, and to stop the latter prior to stopping the former. In order to obtain this sequential operation of valve 133 and clutch 29 by oscillating ring 115, a novel form of lost-motion connection is provided between the arm 118 and ring 115, the effectiveness of which occurs at the beginning of movement of ring 115 in one direction and at the end of movement of said ring in the opposite direction. The connection between ring 115 and arm 118 comprises a square portion 150 on the rod 117 fixed to ring 115. The portion 150 is located within a U-shaped opening 151 formed in the outer end of lever 118. The opening 151 is larger than the portion 150 to permit adequate relative movement between the ring 115 and the arm 118 so that the offset portion of cam groove 147 can actuate the valve 133 while maintaining the clutch 29 in fixed position.

The arm 118 is provided with an axial bore 152 adapted to receive a plunger 153 urged outwardly into opening 151 by a compression spring. The outward movement of plunger 153 is limited by the action of a pin 154 extending therethrough and through aligned elongated slots 156 in opposite sides of the arm 118. The plunger 153 is adapted to be retracted from the opening 151 when the valve 133 is to be actuated, and to be inserted within the opening 151 when the clutch 29 is to be actuated. Accordingly, the pin 154 is provided with a roller 155 adapted to cooperate with a cam 157 fixed to the under surface of the plate 15.

Referring to Fig. 3, the piston 134 is at its inner position thereby supplying fluid under pressure to the conduit 132 (Fig. 8) to effect engagement of clutch element 70 with element 71; and the arm 118 is in position to cause clutch 29 to be engaged with sleeve 55. Accordingly, Fig. 3 discloses the parts in position when a cutting operation is progressing. Initial counter-clockwise movement of ring 115 will be independent of the arm 118 until the portion 150 engages the opposite wall of opening 151. During this initial movement, the cam groove 147 moves in a counter-clockwise direction a corresponding amount, whereupon roller 146 is moved from the position shown in Fig. 3 to the position marked B. This movement of roller 146 withdraws piston 134 to its outer position and causes fluid under pressure to be admitted to conduit 131 to shift clutch element 70 out of engagement with element 71 thereby stopping the feed of slide 13.

Continued counter-clockwise movement of the ring 115 causes the arm 118 to be moved therewith to effect disengagement of clutch 29 from sleeve 55 to stop the spindles 16. During this movement the arcuate portion of cam groove 147 maintains the valve 133 in position to insure separation of clutch elements 70 and 71. Counter-clockwise movement of arm 118 withdraws roller 155 from engagement with cam 157 thereby permitting plunger 153 to enter opening 151 and to assume the position shown in Fig. 6, locking portion 150 to the arm 118.

When it is desired to re-start the lathe, the parts are in the positions disclosed in Fig. 6. Initial clockwise movement of the ring 115 will move arm 118 a like amount causing the clutch 29 to be engaged with sleeve 55 thereby re-starting the rotation of spindles 16. During this initial clockwise movement of ring 115, the cam groove 147 moves a corresponding amount to position the roller 146 in the position marked B (Fig. 6); and the roller 155 engages cam 157 to retract plunger 153 from opening 151. Further clockwise movement of ring 115 returns the parts to the positions shown in Fig. 3 whereupon valve 133 is actuated to engage clutch elements 70 and 71 to re-start the feeding of slide 13.

In order that the operator may more accurately position the control ring 115 to effect the sequential operation of the main driving clutch 29 and the feed clutch members 70 and 71, a bracket 158 is secured to the feed works base 15 having therein a spring-urged indexing point 159 (Fig. 4). An arcuate plate 160 secured to the control ring 115 is provided with 3 notched recesses 161, 162 and 163 to receive the point 159 when the control ring is in the desired positions.

Referring to Fig. 5, a spring-pressed detent 164 is mounted in the center of lever 118 that cooperates with recesses 165 and 166 on the under surface of the base 15, to yieldably hold the lever 118 stationary while the main clutch 29 is engaged or disengaged.

Although the various features of the improved machine tool have been shown and described in detail to fully disclose one embodiment of the invention, it will be evident that numerous changes may be made in such details, and certain features may be used without others, without departing from the principles of the invention.

We claim:

1. A machine tool comprising in combination, means for supporting a work piece; means for supporting a tool adapted to be moved into engagement with the work on said work-supporting means; a power drive for imparting separate motions to the work-supporting means and the tool supporting means; a controller for starting and stopping the motions of said means in accordance with a predetermined sequential order, said controller being rendered effective by the motion of one of said means; and a separate manually-controlled device for starting and stopping said means in accordance with a predetermined sequential order.

2. A machine tool comprising in combination, means for supporting a work piece; means for supporting a tool adapted to be moved into engagement with the work on said work-supporting means; a power drive for imparting separate motions to both of said means; a main clutch for starting and stopping said power drive; an auxiliary clutch between said main clutch and the portion of said power drive that imparts movement to one of said means; and a unitary manually-controlled device for shifting said main and auxiliary clutches into and out of effective positions in accordance with a predetermined sequential order.

3. A machine tool comprising in combination, means for supporting a work piece; means for supporting a tool adapted to be moved into engagement with the work on said work-supporting means; a power drive for imparting separate motions to both of said means; a main clutch for starting and stopping said power drive; an auxiliary clutch between said main clutch and the portion of said power drive that imparts movement to the tool-supporting means; and a unitary manually-operable device for shifting said main and auxiliary clutches into and out of effective positions in accordance with a predetermined sequential order.

4. A machine tool comprising in combination, a rotatable work-supporting table; a tool support adapted to be moved toward and away from said table; and unitary manually-operable means including a member adapted to be moved in one direction for starting the rotation of said table before starting the movement of said tool support and adapted to be moved in another direction for stopping the movement of said tool support before stopping the rotation of said table.

5. A machine tool comprising in combination, a work-supporting table; a tool support adapted to be moved toward and away from said table; a transmission for moving the tool support and for rotating said table in a definite relation; and unitary manually-operable means including a member adapted to be moved in one direction for starting the rotation of said table before starting the movement of said tool support and adapted to be moved in another direction for stopping the movement of said tool support before stopping the rotation of said table.

6. A machine tool comprising in combination, a work-supporting table; a tool support adapted to be moved toward and away from said table; a transmission including a portion adapted to move said tool support and a portion adapted to rotate said table; a main clutch between said transmission and a power source; an auxiliary clutch between said main clutch and one of the portions of said transmission; and manually-controlled means including fluid-operated means for shifting said clutches into and out of effective positions.

7. A machine tool comprising in combination, a work-supporting table; a tool support adapted to be moved toward and away from said table; a transmission including a portion adapted to move said tool support and a portion adapted to rotate said table; a main clutch between said transmission and a power source; an auxiliary clutch between said main clutch and the portion of said transmission that moves said tool support; and manually-controlled means including fluid-operated means for shifting said clutches into and out of effective positions.

8. Apparatus comprising in combination, a pivotally mounted arm; means for oscillating said arm comprising a member adapted to be moved in two directions; and a connection between said arm and said member including a lost motion connection that is effective at the beginning of motion of said member in one direction and at the end of the motion of said member in the other direction.

9. Apparatus as claimed in claim 8, in which said arm is provided with a relatively large opening in which a pin fixed to said member is adapted to be positioned; and means mounted on said arm adapted to prevent relative movement between said arm and member during a portion of the movement of said member in both directions.

10. Apparatus as claimed in claim 8, in which said arm is provided with a relatively large opening adapted to receive a pin mounted on said member; a plunger mounted within a bore in said arm and normally urged into the relatively large opening to lock said pin and arm together; and a cam adapted to retract said plunger from said opening at predetermined points along the path of movement of said member.

11. A machine tool comprising in combination, a transmission; a clutch for transmitting power to said transmission; means for shifting said clutch including a pivotally-mounted arm; means for oscillating said arm comprising a member adapted to be moved in two directions; and a connection between said arm and said member including a lost motion connection that is effective at the beginning of motion of said member in one direction and at the end of the motion of said member in the other direction.

12. Apparatus comprising in combination, a transmission including a main clutch and an auxiliary clutch; means for shifting said clutches in a predetermined sequential order, comprising a common member adapted to be moved in two directions; connections between said clutches and said member, one of which is effective and the other of which is ineffective to shift said clutches at the beginning of movement of said common member in one of its directions of movement, and the former being ineffective and the latter being effective to shift said clutches at the beginning of movement of said common member in its other direction of movement.

13. In a machine tool comprising in combination, a transmission; a source of power for driving said transmission; a clutch for connecting said transmission to, and for disconnecting said transmission from driven means within said machine tool; fluid-operated means for shifting said clutch; and oscillatable means for actuating said fluid-operated means.

14. In a machine tool comprising in combination a plurality of transmissions; a source of power for driving said transmissions; a clutch for connecting each of said transmissions to, and for disconnecting each of said transmissions from driving means within said machine tool; separate fluid-operated means for shifting said clutches; a valve common to all of said fluid-operated means for controlling their operation; and an oscillatable member for actuating said valve.

15. A machine tool comprising in combination, a work-supporting table; a tool support; a transmission for rotating said table and for moving said tool support toward and away from said table; a clutch for connecting said transmission with, and for disconnecting said transmission from driving means within said machine tool; a piston connected to said clutch; fluid-operated means for shifting said clutch, including a valve for selectively admitting fluid under pressure to opposite sides of said piston; and an oscillatable member for actuating said valve.

16. A machine tool comprising in combination, a work-supporting table; a tool support; a transmission adapted to rotate said table, and to move said tool support toward and away from said table; a main clutch for connecting said transmission to and disconnecting said transmission from a source of power; an auxiliary clutch for connecting said transmission to, and for disconnecting said transmission from said tool support; means for shifting said clutches in a predetermined sequential order comprising common oscillatable means; connections between said common means and said clutches comprising means for preventing clutch-actuating movement during portions of said oscillatable movement of said common means in each direction.

17. A machine tool as claimed in claim 16, in which fluid-operated means is provided for actuating one of said clutches; and a cam is provided on said common means for actuating said fluid-operated means.

18. In a machine tool, means adapted to support work for movement; means adapted to support a tool for movement toward and from said work support; driving means for moving said work and tool supports; means for starting and stopping the movements of said work and tool supports in accordance with a determined order including an arm and lever respectively; and a member adapted to be moved in two directions adapted to actuate said arm at the beginning and said lever at the end of movement of said member in one direction and to actuate said lever at the beginning and said arm at the end of movement of said member in the other direction.

EDWARD P. BULLARD, III.
GUSTAF R. APPELBERG.
ERNEST H. JOHNSON.